(12) United States Patent
Maenosono

(10) Patent No.: US 6,778,057 B2
(45) Date of Patent: Aug. 17, 2004

(54) INDUCTOR FOR HEATING INNER-CIRCUMFERENCE OF HOLE

(75) Inventor: Tsukasa Maenosono, Kawasaki (JP)

(73) Assignee: DAI-ICHI High Frequency Co., Ltd., Tokyo (JP)

(*) Notice: Subject to any disclaimer, the term of this patent is extended or adjusted under 35 U.S.C. 154(b) by 0 days.

(21) Appl. No.: 10/266,645

(22) Filed: Oct. 9, 2002

(65) Prior Publication Data
US 2003/0067376 A1 Apr. 10, 2003

(30) Foreign Application Priority Data
Oct. 10, 2001 (JP) ..................... 2001-312304

(51) Int. Cl.⁷ .............................. H01F 38/20
(52) U.S. Cl. ....................... 336/174; 336/175
(58) Field of Search ................... 336/174, 179, 336/175, 200, 223, 173

(56) References Cited

U.S. PATENT DOCUMENTS 5,450,052 A * 9/1995 Goldberg et al. ............. 336/83
5,532,664 A * 7/1996 Buckles et al. ............. 335/216
6,542,060 B2 * 4/2003 Fedeli ....................... 336/174

FOREIGN PATENT DOCUMENTS

| JP | 4-22094 | 1/1992 |
| JP | 2634294 | 1/1992 |
| JP | 5-337750 | 12/1993 |

* cited by examiner

Primary Examiner—Anh Mai
(74) Attorney, Agent, or Firm—Westerman, Hattori, Daniels & Adrian, LLP

(57) ABSTRACT

There is provided an inductor for heating the inner circumference of a hole, by which induction heating of the inner circumference of a hole and so on can be realized rapidly and uniformly in the direction of the circumference, and there is no risk of a short-circuit between a solenoidal coil and transition conductor passing therethrough. According to a configuration in which a magnetic core 12 with a cylindrical shape is arranged inside of a solenoidal coil 11a which forms the inductor 10, and a transition conductor 11c extending from one end of the solenoidal coil 11a to a feeding terminal through the inside of the solenoidal coil is arranged in an inserted manner into a hollow portion of the magnetic core 12, a risk of the short circuit is avoided by using an insulating material for the magnetic core 12, assuming that the magnetic core 12 with a large cross-sectional area is concentrically arranged in the solenoidal coil 11a.

25 Claims, 4 Drawing Sheets

(a)

(b)

INDUCTOR FOR HEATING INNER-CIRCUMFERENCE OF HOLE

BACKGROUND OF THE INVENTION

1. Field of the Invention

The present invention relates to an inductor for heating the inner circumference of a hole, and the inductor is used for heating a tube from the inside in order to extract the tube for heat transfer in a boiler, a condenser, and so on from a tube plate, or, for heating a cylinder in a similar manner from the inside in order to perform heat treatment of the inner circumference of a cylinder.

2. Description of the Prior Art

Conventionally, a part which a tube is inserted into and fixed at a tube plate has been heated, and loosened in order to extract an existing tube from the tube plate when the tube is replaced for boilers and condensers, and an inductor which is inserted into the inside of the tube for induction heating of the tube has been well-known (refer to, for example, Japanese Patent Application Laid-Open No. 4-22094, and Japanese Patent Application Laid-Open No. 5-337750). Here, the above loosening is caused by a mechanism in which, as a tube is heated in the first place before the tube plate is done; the tube which is going to thermally expand is prevented from expanding in the diameter by a constraint of the tube plate which has been neither heated yet nor expanded; and, instead, an outside diameter/wall thickness ratio is reduced after deformation by compressive yielding, the outside diameter after cooling becomes smaller than the original one to cause a clearance between the tube and the tube plate. That is, the above-described heating is required to be done rapidly (for example, the rate of heating is 100° C./second) so that only the tube becomes red hot before heat is transmitted to the tube plate. A conventional inductor 1 which is used for the above induction heating comprises: a solenoidal coil 2a having a configuration in which a conductive tube 2 such as a copper tube is spirally wound as shown in FIG. 4; a transition conductor 2b extending from one end of the solenoidal coil 2a to a feeding terminal (not shown in the figure) ; and a transition conductor 2c extending from the other end of the coil 2a to another feeding terminal (not shown in the figure) through the inside of the solenoidal coil 2a. Moreover, there has been also known another inductor with a configuration in which a magnetic core 3 is arranged in the solenoidal coil 2a as shown in FIG. 5.

As the induction heating by the inductor arranged in the inside of the tube has a low ratio of magnetic-flux concentration on the tube body, the heating efficiency of the above heating is remarkably low, comparing with that of induction heating by the inductor arranged in the outside of the tube. Thereby, it is actually indispensable to arrange a magnetic core for improving action of electromagnetic induction on the tube body in a case in which rapid heating is required like the above-described heating for extracting the tube. Accordingly, the magnetic core is configured to be arranged as shown in FIG. 5.

However, a heat exchanger tube which is a target tube for the above tube extracting has a small diameter, and there is only a narrow space with an inside diameter of about 20–60 mm in the inside of the tube in many cases. Moreover, the outside diameter of the copper tube forming the solenoidal coil usually is 2 mm or more as the hollow portion of the tube is configured to be a cooling water channel.

Then, the above-described limitation by the size causes the following problems: In the first place, there is an increased risk that the solenoidal coil 2a and the transition conductor 2c come into contact with each other to cause a short circuit. The above-described short circuit is required to be avoided at any cost as the short circuit is an event in the coil in which a large current of hundreds of amperes flows, and, then, insulation coating with high reliability exceeding a usual level, that is, a large cost will be required.

In the second place, the magnetic core 3 is required to be arranged eccentric to the solenoidal coil 2a as shown in FIG. 5. The eccentric arrangement of the magnetic core causes clearance shortage in a specific direction on the tube circumference, and makes smooth processing for extracting the tube difficult, as not-uniform heating temperature in the direction of the tube circumference causes not-equal distribution, in the circumference direction of the tube, of the above deformation by compressive yielding; and, then, loosening which makes the tube cross section become elliptical in shape.

In the third place, the cross-sectional area of the magnetic core 3 becomes about ½ or less of the space in the solenoidal coil 2a. At induction heating, the magnetic flux is saturated in many cases as the temperature of the magnetic core considerably rises too, and, a value of the saturation magnetic flux density at the risen temperature becomes several times as small as that of the above density at room temperature. Therefore, it is not easy to secure the above-described and preferable rate of the temperature rise when the cross-sectional area of the magnetic core is small, as there is a tendency that the improved effect of the induction action directly depends on the cross-sectional area of the magnetic core.

The present invention has been made considering the above problems, and the object of the invention is to provide an inductor for heating the inner circumference of a hole, by which there is a small risk of a short circuit in the coil, and induction heating of the inner circumference of a hole and so on can be realized rapidly and uniformly in the circumference direction.

SUMMARY OF THE INVENTION

An inductor for heating the circumference of a hole according to the present invention is characterized by a configuration in which the inductor comprises a solenoidal coil and a magnetic core arranged therein; the magnetic core has a cylindrical shape; feeding to one end part of the above solenoidal coil is performed through transition conductor which are arranged in an inserted manner into a hollow portion of the cylindrical magnetic core.

The above-described inductor according to the present invention has the following advantages by the configuration in which the transition conductor is arranged in an inserted manner into the hollow portion of the cylindrical magnetic core:

(1) A risk of a short-circuit between the solenoidal coil and the transition conductor may be avoided.

Here, the volume resistivity of ferrite (MO-$Fe_2O_3$ type iron oxide) suitable for forming a magnetic core at room temperature is of the order of $10^0$–$10^7$ Ωcm, which is at least $10^6$ times the order of $10^{-6}$ Ωcm which is the volume resistivity of copper metal forming the coil. Therefore, a short-circuit current at indirect contact between the solenoidal coil and the transition conductor through the magnetic core formed with the above-described ferrite must be about 1/1000 times that of direct contact between the solenoidal-coil and the transition conductor, even if it is assumed that quantity indicating the ease of passage of an electric current for the magnetic core is 10 times that for the coil, in the geometrical factors defined by geometrical shape and size, and the value of the volume resistivity becomes 1/100 time the value at room temperature by the temperature rise of the magnetic core at use. That is, the above-described risk of a short-circuit (overheat damages, spark damages, and so on) may be substantially avoided, as a short-circuit current at indirect contact through the magnetic core becomes only hundreds of milliamperes if a short-circuit current at direct contact is hundreds of amperes (2) As heating of the tube uniformly in the circumference direction is realized by concentrical arrangement of the magnetic core to the coil, the loosening form without distortion of the cross-sectional shape of the tube may be realized when the inductor is used for extracting the tube.

(3) The cooling effect by flow cooling of the solenoidal coil extends to the magnetic core, and the saturation magnetic flux density is maintained at a higher value, as the cross-sectional area of the magnetic core may be expanded up to about 90 percent of the space in the coil, and, furthermore, the inside and outside surfaces of the magnetic core completely face with the solenoidal coil and the transition conductor, respectively. Accordingly, the above-described improved effect of the induction action may be obtained to the utmost limit by both the above increase in the cross-sectional area of the magnetic core, and the saturation magnetic flux density maintained at a higher value. Thereby, the above-described, and preferable rate of the temperature rise may be secured easily and with the minimum power.

Thus, the above-described problems have been solved by the present invention.

BRIEF DESCRIPTION OF THE DRAWINGS

FIG. 1A is a schematic view of the cross section; FIG. 1B is a schematic side view; and FIG. 1C is a schematic view of the end part.

FIG. 3A is a schematic side view; and FIG. 3B is a schematic view of the end part.

FIG. 4A is a schematic side view; and FIG. 4B is a schematic view of the cross section taken along the A—A line in FIG. 4A.

FIG. 5A is a schematic side view; and FIG. 5B is a schematic view of the cross section taken along the B—B line in FIG. 5A.

DETAILED DESCRIPTION OF PREFERRED EMBODIMENTS

Figure 1:
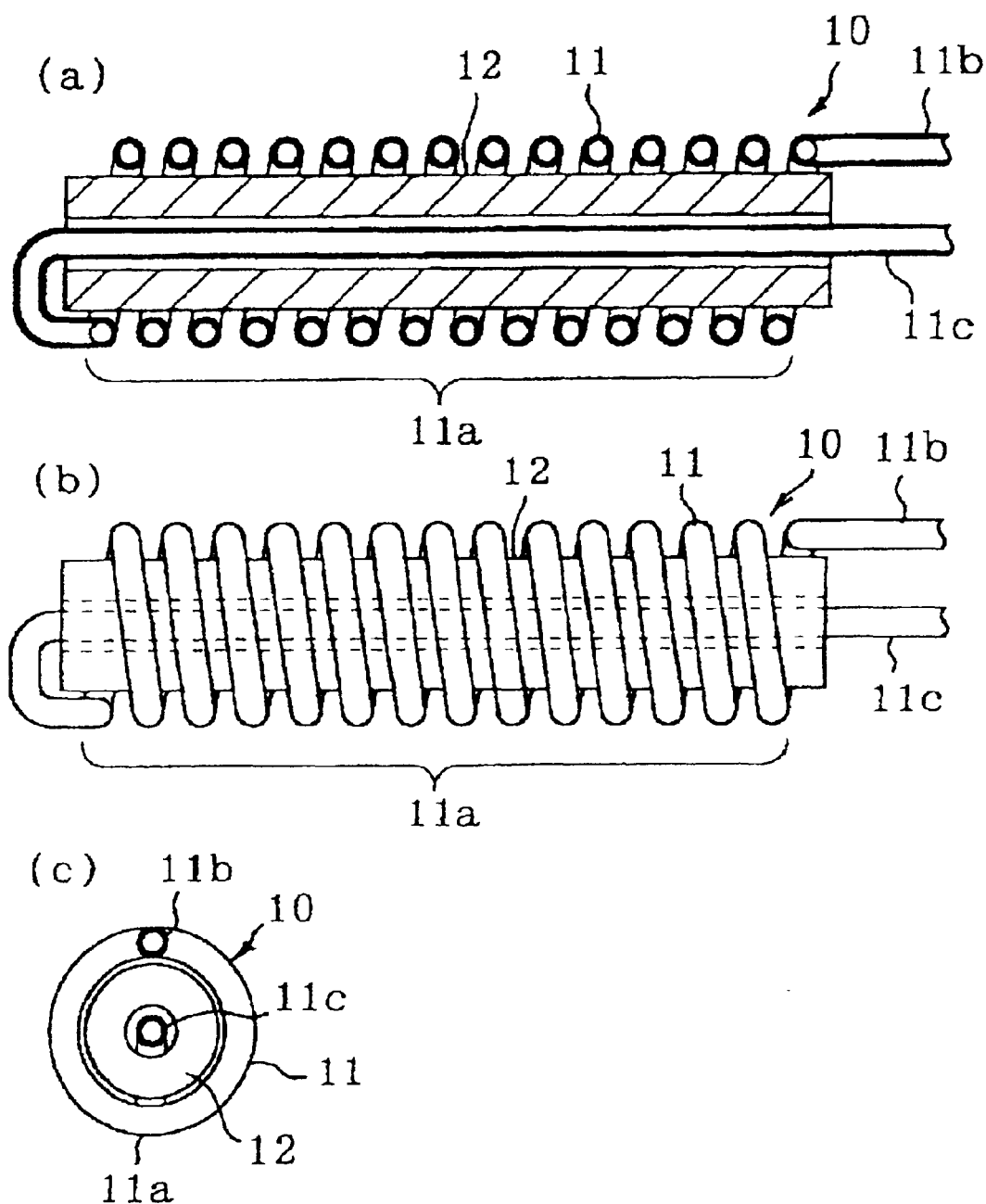
FIG. 1 shows an inductor according to one embodiment of the present invention.
Figure 2:
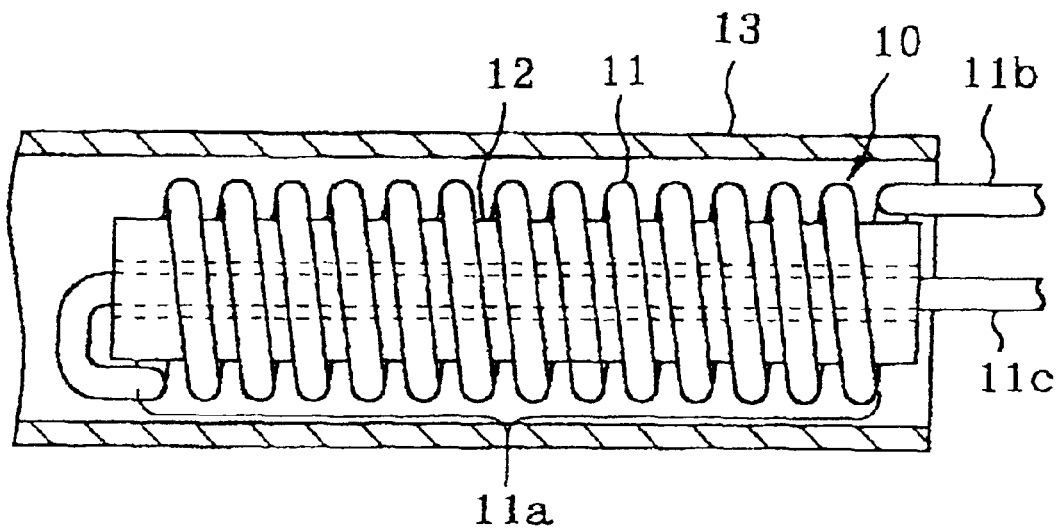
FIG. 2 is a schematic view of the cross section showing a state in which the inductor 10 shown in FIG. 1 is inserted into a tube 13.

Hereinafter, the present invention will be described in detail, referring to embodiments in the drawing. FIG. 1 shows an inductor 10 according to one embodiment of the present invention, and FIG. 1A is a schematic view of the cross-section; FIG. 1B is a schematic side view; and FIG. 1C is a schematic view of the end part. FIG. 2 is a schematic view of the cross section showing a state in which the inductor 10 is inserted into a tube 13. The inductor 10 comprises: a solenoidal coil 11a having a configuration in which an electric conductor 11 is spirally wound; a transition conductor 11b extending from one end of the solenoidal coil 11a to a feeding terminal (not shown in the figure); and a transition conductor 11c extending from the other end of the solenoidal coil 11a to another feeding terminal (not shown in the figure) through the inside of the solenoidal coil 11a; and a ferromagnetic magnetic core 12 which is arranged inside of the solenoidal coil 11a. The magnetic field is also caused around the outside of the solenoidal coil 11a by inserting the inductor 10 with the above configuration into the tube 13 to be heated, for example, as shown in FIG. 2, and by electrically-charging the solenoidal coil 11a. Thereby, the inductor 10 may realize induction heating of the tube 13 from the inside thereof.

Here, the magnetic core 12 provided in the above-described inductor 10 is formed in a hollow cylinder, and concentrically arranged in the solenoidal coil 11a; and the transition conductor 11c is arranged in an inserted manner into the central portion of the magnetic core 12. The magnetic core 12 arranged inside of the solenoidal coil 11a is provided not only for improving the action effect of the induction heating by concentrating the magnetic flux, but also for preventing short-circuit between the transition conductor 11c, which is arranged in an inserted manner into the inside of the magnetic core 12, and the solenoidal coil 11a. Therefore, the magnetic core 12 is made of a material not only with ferromagnetism, but also having a volume resistivity value which is suitably large. In one example of a concrete aspect of the magnetic core 12, the core 12 may be made by molding ferromagnetic powder such as ferrite with heat-resistant binder. Preferably, the volume resistivity value of the magnetic core is in the range of $10^3$–$10^7$ Ωcm. The reason is that there is substantially no risk of the short-circuit at all, as, under the assumption that the volume resistivity value of the magnetic core is equal to or larger than $10^3$ Ωcm, the indirect short-circuit current through the magnetic core becomes equal to or smaller than hundreds of microamperes (Refer to the advantages of the inductor according to the present invention described in the last part of the section "SUMMARY OF THE INVENTION") when the direct short-circuit current in the coil is hundreds of amperes. Thereby, it is preferable to select a magnetic core provided with desired magnetic characteristics, and so on among easily-procurable magnetic cores which have a volume resistivity value up to $10^7$ Ωcm. The length of the magnetic core 12 is usually assumed to be approximately the same as that of the solenoidal coil 11a, but the length may be different from that of the solenoidal coil 11a as required.

As described above, the cylindrical magnetic core 12 is concentrically arranged in an inserted manner into the solenoidal coil 11a, and the transition conductor 11c is arranged in an inserted manner into the central portion of the magnetic core 12. According to the above configuration, the outside diameter of the magnetic core 12 may take approximately a similar value to that of the inside diameter of the solenoidal coil 11a, and, then, the cross-sectional area of the magnetic core 12 may be made extremely large by making the inside diameter of the magnetic core 12 smaller within the range in which the transition conductor 11c can be arranged in an inserted manner. Thus, as the quantity of the magnetic flux, which is focused in the magnetic core 12 of the solenoidal coil 11a, may be extremely increased by making the cross-sectional area of the magnetic core 12 large, the strength of the magnetic field caused around the outside of the solenoidal coil 11a may be made extremely large. Moreover, the strength of the magnetic field in the circumference direction may be made uniform by concentrical arrangement of the magnetic core 12 in the solenoidal coil 11a. Thereby, the inner circumference of the hole may be heated rapidly and uniformly in the circumference direction by heating after inserting the inductor 10 into the hole, for example, of the tube 13, to be heated. When the inductor 10 is used for heating a tube so that the tube is extracted, a loosening form by rapid and uniform heating of the tube in the circumference direction without distortion of a cross-sectional shape may be realized.

With regard to the solenoidal coil 11a and the transition conductors 11b, 11c, it is preferable to perform insulation coating, at least, on the electric conductor forming the solenoidal coil 11a by alumina thermal spraying and so on. When the inductor 10 is inserted into the hole to be heated, and is electrically charged after performing the above insulation coating, there is safely caused no short-circuit, even if the solenoidal coil 11a comes in contact with the inside of the hole. Here, the insulation coating may be performed only on an area of the outside of the solenoidal coil 11a which has a possibility to come in contact with the inside of the hole to be heated. But, when the insulation coating is also performed on other areas of the solenoidal coil 11a, and the transition conductor 11c which is inserted into the solenoidal coil 11a for arrangement, there may be obtained an advantage that continuity between the solenoidal coil 11a and the transition conductor 11c through the magnetic core 12 is surely interrupted.

Figure 3:
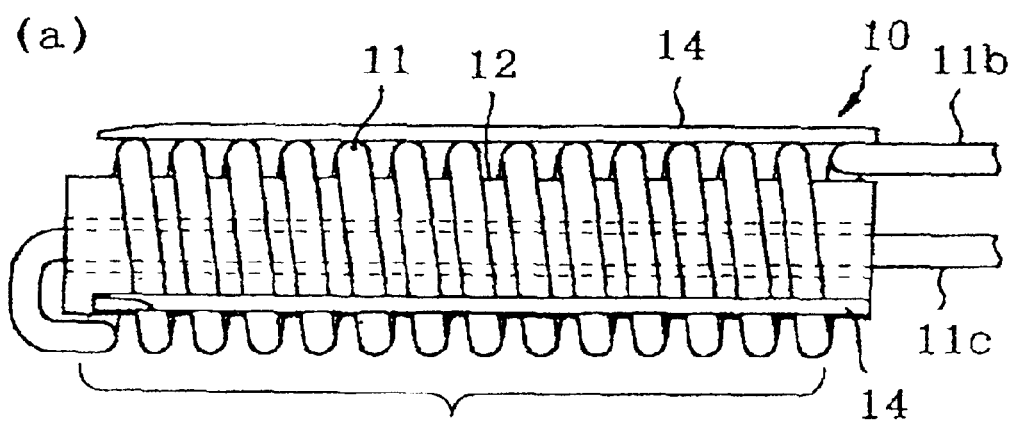
FIG. 3 shows an inductor according to another embodiment of the present invention.
Figure 3:
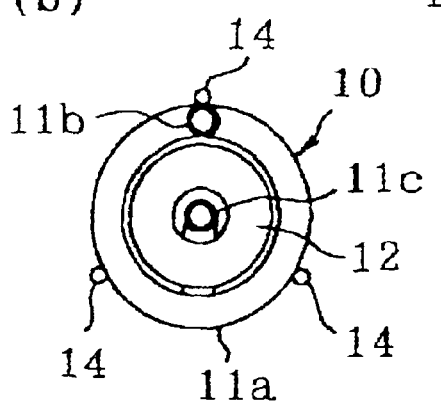
Figure 4:
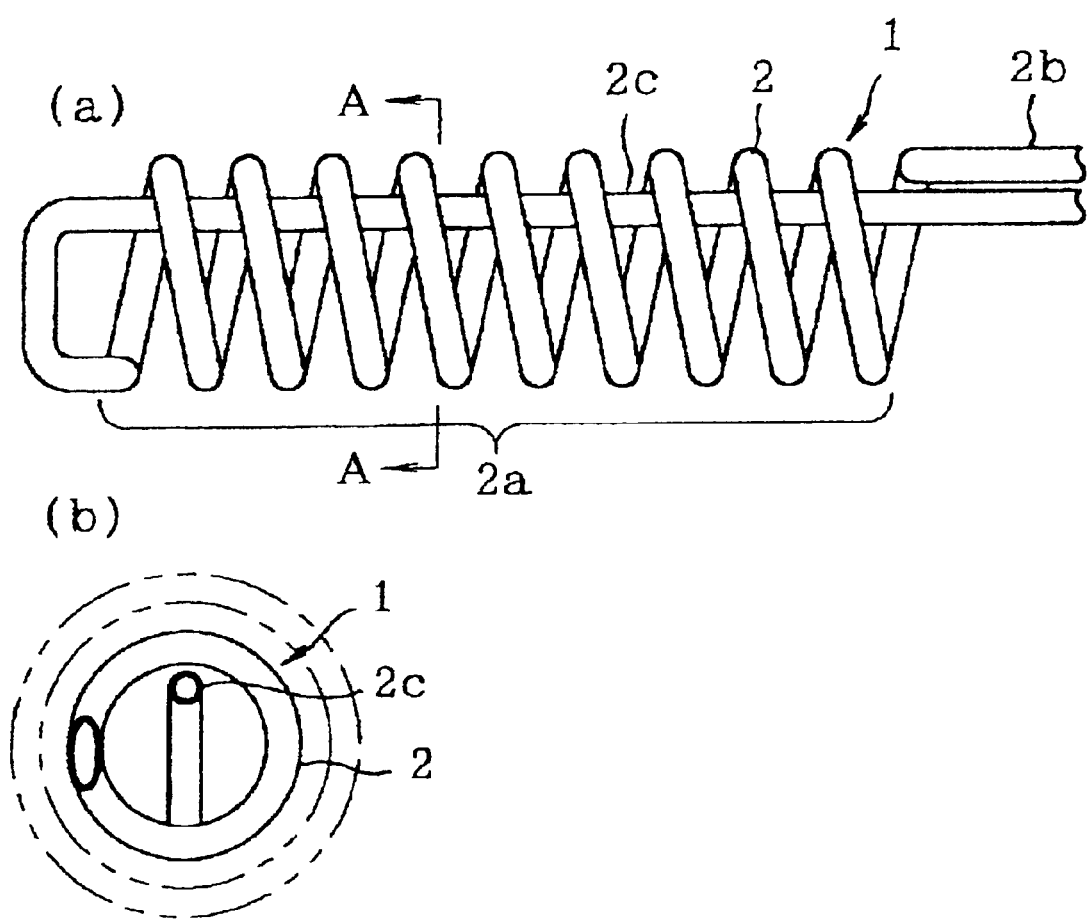
FIG. 4 shows one example of a conventional inductor.
Figure 5:
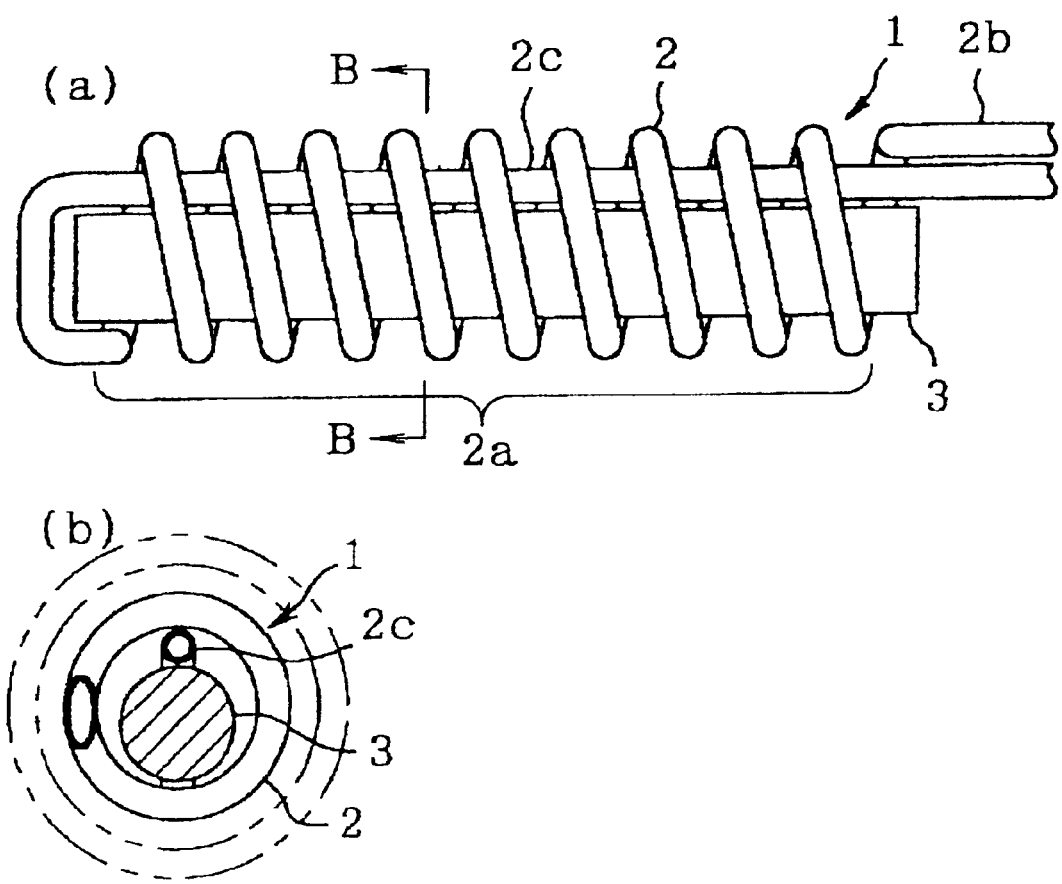
FIG. 5 shows another example of the conventional inductor.

Though there is no parts at all on the outside of the solenoidal coil 11a in the embodiment shown in FIG. 1, spacers 14 of an insulating material to keep the distance between the solenoidal coil 11a and the inner circumference of the hole equal may be configured to be arranged on the outside of the solenoidal coil 11a as shown in FIG. 3. When the spacers 14 are provided, the concentrical arrangement with the inner circumference of the hole in the solenoidal coil 11a may be easily realized at inserting the inductor 10 into the hole. Though three bar materials are used as the spacers 14 for the above configuration in the embodiment shown in the drawing, the form of the spacers 14 is not limited to the above configuration, and variations can be suitably executed. For example, ring materials of a predetermined thickness may be provided at a plurality of points on the conductor forming the solenoidal coil 11a as the spacers for modification. The above-described spacers have an advantage that contact with the inner circumference of the solenoidal coil is prevented to secure further reliable insulation.

The heating target of the inductor 10 is arbitrary if it is on the inner circumference of the hole. Moreover, there is no limitation at all on the heating object. An example of heating the whole tube wall by heating the inner circumference of the tube in order to extract the tube from the tube plate in a boiler, a condenser, and so on; and an example of heating the inner circumference of the hole for heating processing of the inner circumference of the cylinder, and so on may be listed as a typical use example of the inductor 10.

The length and the outside diameter of the solenoidal coil 11a in the inductor 10 may be suitably set according to the size of the inner circumference of the hole to be heated. The uniform distribution of the heating temperature on the inner circumference of the hole is remarkably effected by a spiral pitch p of the solenoidal coil 11a. That is, when the inner circumference of the hole is heated by the solenoidal coil 11a, there is a tendency in which the heating power of the area near the conductor 11 forming the solenoidal coil 11a becomes large. Therefore, in the case of too large spiral pitch p, the inner circumference of the hole is spirally heated, and there is a possibility to cause large irregularity in the temperature in the direction of the axis line of the hole. Then, the spiral pitch p is required to be reduced to a certain value or less than the certain value in order to avoid the above irregularity. On the other hand, when the spiral pitch p is made too small, the number of turns is increased to make the length of the electric conductor under use longer, and, furthermore, the uniformity of the heating is not improved so much even if the pitch p is made much smaller. Therefore, the spiral pitch p may be set in consideration of the above circumstances. The inventors of the present invention have confirmed in the case of the inductor 10 used for heating for extracting the tube from the tube plate in a boiler, a condenser, and so on that uniform heating at a level necessary for extracting the tube could be performed by setting the dimension of the spiral pitch p to be 1–2.5 times the size of the wall thickness of the tube. Thereby, it is preferable in the inductor used for heating the tube to set the pitch p of the solenoidal coil to be 1–2.5 times the size of the wall thickness of the tube.

The spiral pitch p of the solenoidal coil 11a may be uniform all over the length of the coil, but it is preferable to set the pitch of the end part of the solenoidal coil 11a to be 0.5–0.9 times that of the central portion of the solenoidal coil 11a which has been set according to the thickness of the tube. As described above, when the pitch p of the end part is set to be smaller than that of the central portion, the density of the heat input at the end part becomes large, and the input calorific power to the inner circumference of the hole may be made high in comparison with that of the central portion. In general, when the inner circumference of the hole is heated with the solenoidal coil 11a of a finite length, there is a tendency in which the temperature at both ends of the heating area lower in comparison with that of the central portion as heat radiation is larger at both ends of the heating area than that of the central portion. Therefore, as described above, uniform heating in the axis-line direction may be realized by making the density of the heat input at the both end parts larger than that of the central portion.

Any material may be applied for the electric conductor 11 used for the solenoidal coil 11a, if the material is conductive, but it is preferable to use a metallic tube such as a copper tube. When the metallic tube is used, the hollow portion may be used as a cooling water channel letting the cooling medium such as cooling water flow to cause easy cooling of the solenoidal coil 11a. Moreover, the rise in the temperature of the magnetic core 12 may be controlled by water cooling of the solenoidal coil 11a. Thereby, reduction in the saturation magnetic flux density of the magnetic core 12 is controlled to cause efficient induction heating.

When the metallic tube is used for the solenoidal coil 11a, the outside diameter of the metallic tube may be of a size that can be easily obtained, and suitable for forming the solenoidal coil 11a with an outside diameter which can be inserted into the hole to be heated. Specifically, in the inductor 10 used for heating a tube in a boiler, a condenser, and so on a solenoidal coil 11a which can be adaptive for a tube with almost all the sizes, which are used for a boiler and a condenser may be formed, if the outside diameter of the metallic tube forming the solenoidal coil 11a is set as about 2–8 mm. Furthermore, tubes with most of sizes which are used in boilers, condensers, and so on may be favorably heated by setting the pitch p of the coil in the solenoidal coil 11a in the above case to be about 3–12 mm.

When the metallic tube forms the solenoidal coil 11a, a communicated hollow portion is preferably assumed to be a cooling water channel by using metallic tubes such as copper tubes for the transition conductors 11b, 11c connected to the solenoidal coil 11a, and by communicating of the hollow portion of the metallic tube with that portion of the metallic tube forming the solenoidal coil 11a (cooling of the transition conductor is also useful for control of the rise in the temperature of the magnetic core). According to the above configuration, a simple structure may be obtained by using the transition conductor both for a supplying channel of cooling water to and for a discharging channel of the water from the solenoidal coil 11a. Moreover, when the solenoidal coil 11a and the transition conductors 11b, 11c are formed with the metallic tube all together, a configuration in which individually-different metallic tubes may be used and connected to each other by brazing and soon, but, instead, it is preferable to have a configuration in which a continuous metallic tube is used for the solenoidal coil 11a, and the transition conductors 11b, 11c. According to the above configuration, advantages in which, for example, there are caused no problems such as damages at connecting portions may be obtained, as connecting work is not required, and there are no connecting portions.

As described above, according to the present invention, a risk of short circuit between the solenoidal coil and the transition conductor may be avoided; a strong magnetic field may be also caused around the solenoidal coil uniformly in the circumference direction; and heating may be done rapidly and uniformly in the circumference direction of the inner circumference of a hole into which the solenoidal coil is inserted, by a configuration in which a magnetic core arranged inside of a solenoidal coil has a cylindrical shape, and transition conductor is arranged in an inserted manner into a hollow portion of the cylinder. Thus, there are the following advantages: an area in which the tube is fixed on the tube plate is rapidly and uniformly heated for favorable loosening, and a work for extracting the tube is safely and efficiently performed by using the inductor according to the present invention for heating a tube at extracting the tube fixed on a tube plate in a boiler, a condenser, and so on. Moreover, the inner circumference of the hole is rapidly heated uniformly in the circumference direction, and high-quality heating processing may be safely, and efficiently performed by using the inductor for heat treatment of an inner circumference of a cylinder.

What is claimed is:

1. An inductor for heating the inner circumference of a hole comprising:
   a solenoidal coil; and
   a magnetic core arranged inside of the solenoidal coil;
   wherein the shape of the magnetic core is of a cylinder shape, and
   wherein feeding to one end of the solenoidal coil is performed through a transition conductor which is arranged in an inserted manner into a hollow portion of the magnetic core of a cylinder shape.

2. An inductor for heating the inner circumference of a hole comprising:
   a solenoidal coil; and
   a magnetic core arranged inside of the solenoidal coil;
   wherein the shape of the magnetic core is of a cylinder shape,
   wherein feeding to one end of the solenoidal coil is performed through a transition conductor which is arranged in an inserted manner into a hollow portion of the magnetic core of a cylinder shape, and
   wherein a ferromagnetic magnetic core with a volume resistivity value of $10^3$–$10^7$ Ωcm is used as the magnetic core.

3. The inductor for heating the inner circumference of a hole according to claim 2, wherein with regard to the solenoidal coil and the transition conductor, an insulation coating is performed, at least, on the solenoidal coil.

4. The inductor for heating the inner circumference of a hole according to claim 3, wherein spacers for keeping the distance between the solenoidal coil and the inner circumference of the hole equal are arranged on the outside of the solenoidal coil.

5. The inductor for heating the inner circumference of a hole according to claim 4, wherein the inner circumference of the hole to be heated is the inside of a tube, and wherein a spiral pitch of the solenoidal coil is set to be 1–2.5 times the size of the wall thickness of the tube.

6. The inductor for heating the inner circumference of a hole according to claim 5, wherein the spiral pitch of the solenoidal coil at the end parts of the coil are set to be 0.5–0.9 times that of the central portion of the coil which has been set according to the wall-thickness of the tube.

7. The inductor for heating the inner circumference of a hole according to claim 6, wherein the solenoidal coil is formed with a metallic tube having an outside diameter of 2–8 mm, setting the spiral pitch to be 3–12 mm.

8. The inductor for heating the inner circumference of a hole according to claim 7, wherein the transition conductors are formed with a metallic tube, and wherein the hollow portion of the transition conductors are joined with the hollow portion of the solenoidal coil, and then the communicated hollow portion is assumed to be a cooling water channel.

9. The inductor for heating the inner circumference of a hole according to claim 8, wherein a continuous metallic tube is used for the solenoidal coil and the transition conductors.

10. An inductor for heating the inside of a tube comprising:
    a solenoidal coil; and
    a magnetic core arranged inside of the solenoidal coil;
    wherein the shape of the magnetic core is of a cylinder shape,
    wherein feeding to one end of the solenoidal coil is performed through a transition conductor which is arranged in an inserted manner into a hollow portion of the magnetic core of a cylinder shape,
    wherein with regard to the solenoidal coil and the transition conductor, an insulation coating is performed, at least, on the solenoidal coil, and
    wherein a spiral pitch of the solenoidal coil is set to be 1–2.5 times the size of the wall thickness of the tube.

11. The inductor for heating the inside of a tube according to claim 10,
    wherein the spiral pitch of the solenoidal coil at the end parts of the coil are set to be 0.5–0.9 times that of the central portion of the coil which has been set according to the wall-thickness of the tube.

12. The inductor for heating the inside of a tube according to claim 11,
    wherein the solenoidal coil is formed with a metallic tube having an outside diameter of 2–8 mm, setting the spiral pitch to be 3–12 mm.

13. The inductor for heating the inside of a tube according to claim 12,
    wherein the transition conductor is formed with a metallic tube, and wherein the hollow portion of the transition conductor is joined with the hollow portion of the solenoidal coil, and then the communicated hollow portion is assumed to be a cooling water channel.

14. The inductor for heating the inside of a tube according to claim 13, wherein a continuous metallic tube is used for the solenoidal coil and the transition conductors.

15. The inductor for heating the inside of a tube according to claim 14,
wherein spacers for keeping the distance between the solenoidal coil and the inner circumference of the hole equal are arranged on the outside of the solenoidal coil.

16. An inductor for use in heating an inner circumference of a hole comprising:
a solenoidal coil having a first end and a second end;
a magnetic core having a hollow, provided inside the solenoidal coil; and
a transition conductor connected to the first end of the solenoidal coil, wherein the transition conductor is extended through the hollow of the magnetic core in the direction of the second end of the solenoidal coil.

17. The inductor according to claim 16, wherein the magnetic core is of a ferromagnetic magnetic core having a volume resistivity value of $10^3$–$10^7$ $\Omega$cm.

18. The inductor according to claim 16, wherein the solenoidal coil has an insulation coating thereon.

19. The inductor according to claim 16, wherein the solenoidal coil has a spacer provided on the outside thereof, for spacing the solenoidal coil evenly from the inner circumference of the hole.

20. The inductor according to claim 16, wherein the inner circumference of the hole is an inside portion of a tube.

21. The inductor according to claim 20, wherein the solenoidal coil has a spiral pitch of 1 to 2.5 times as large as a thickness of the tube.

22. The inductor according to claim 16, wherein the solenoidal coil has both end portions and a central portion between the end portions, and wherein the end portions have a spiral pitch 0.5–0.9 times of that of the central portion.

23. The inductor according to claim 16, wherein the solenoidal coil is prepared by winding a metallic tube having an outside diameter of 2–8 mm, with a spiral pitch of 3–12 mm.

24. The inductor according to claim 16, wherein the solenoidal coil is made of a first metallic tube, wherein the transition conductor is made of a second metallic tube, wherein the first metallic tube is connected to the second metallic tube, and wherein a cooling water is supplied inside the first metallic tube connected to the second metallic tube.

25. The inductor according to claim 16, wherein the inductor is prepared by winding a tube.

* * * * *